UNITED STATES PATENT OFFICE 2,659,742

$\Delta^{1,2}$-ALLOPREGNENES AND PROCESS

George Rosenkranz, Stephen Kaufmann, and John Pataki, Mexico City, Mexico, assignors to Syntex S. A., Mexico City, Mexico, a corporation of Mexico No Drawing. Application January 23, 1950, Serial No. 140,153

6 Claims. (Cl. 260—397.4)

The present invention relates to new cyclopentano-phenanthrene derivatives and process for producing the same. More particularly, the present invention relates to new allopregnane derivatives and to a novel process for preparing these derivatives. The new compounds, with which this present invention is particularly concerned, are derivatives of allopregnane having a hydroxy group at the 17α position and a hydroxy or acyloxy group in the 21-position. Compounds of this character are especially suitable as therapeutics and/or intermediates for the production of therapeutically useful products.

The starting material for the production of the aforesaid derivatives is the allopregnane-3β,17α,21-triol-20-one (Reichstein's substance P) esterified by a low fatty acid in the 21-position, as for example, acetic acid, propionic acid, etc. It has been found, in accordance with the present invention, that when the aforesaid compound is treated with a mol quantity of bromoacetamide in the presence of a weak organic base, such as pyridine, an oxidation of the hydroxyl group in position 3 takes place with the production of allopregnane - 17α,21 - diol - 3,20 - dione 21-acylate.

It has been further found that upon treatment of allopregnane-17α,21-diol-3,20-dione 21-acylate with 1 mol of bromine a new compound 2-bromo-allopregnane-17α,21-diol-3,20-dione 21-acylate is produced. Thereafter, upon dehydrobromination the unsaturated or $\Delta^{1,2}$ corresponding derivative is produced, i. e. $\Delta^{1,2}$-allopregnene-17α, 21-diol-3,20-dione 21-acylate. Although bromoacetamide in the presence of pyridine is the preferred oxidizing agent for the production of the 3 keto compound previously described, other brominated or chlorinated amides, both aliphatic and aromatic, may be used, such as bromotoluensulfonamide, bromophthalimide, bromosuccinimide or chlorosuccinimide.

In other words, the amides which may be used in the first step of the present reaction may be exemplified by the following formula:

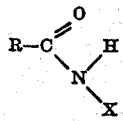

wherein R is an aromatic or aliphatic radical and X is selected from the group consisting of bromine or chlorine. In place of pyridine, which is preferred for the present reaction, other weak organic bases may be used, as for example, collidine, lutidine or diethyl aniline. For the dehydrobromination step of the present process the use of collidine is preferred. However, in place of collidine, pyridine, lutidine or diethyl aniline may be used.

In general, for the first step of the present process the allopregnane-3β,17α,21-triol-20-one 21-acylate may be dissolved in a suitable solvent, such as tertiary butyl alcohol and a small amount of pyridine together with 1 mol of bromoacetamide are added for each mol of the allopregnane compound. The solution is allowed to stand for a prolonged period of the order of one day at room temperature and thereafter concentrated in vacuo. The concentrate may then be diluted with water and the precipitate filtered and washed with water. Thereafter the precipitated diketone may be recrystallized from ethanol. For the bromination step the diketone is preferably dissolved in glacial acetic acid and treated with a molar quantity of bromine for each mol of diketone in the presence of a few drops of concentrated hydrobromic acid. In the alternative the diketone may be treated with chlorine to produce the corresponding chloro compound. The reaction mixture produced after a short period of time, as for example ten minutes, is then poured into water and the precipitate filtered and washed with water. The bromo-ketone thus produced may be also recrystallized as from ethanol. The dehydrobromination of the bromo-ketone compound, as previously set forth is preferably performed by the use of collidine. Preferably the compound is refluxed with the collidine for a period of time of the order of 45 minutes. The reaction mixture is then cooled, treated with ethyl acetate and washed with a dilute mineral acid, as for example sulfuric acid, and then with water to neutrality. The solution is then dried and concentrated until crystallization begins. It is then cooled and the compound is then filtered and recrystallized from ethyl acetate.

The corresponding $\Delta^{1,2}$-allopregnene-17a,21-diol-3,20-dione can be produced by mild hydrolysis or saponification of the corresponding 21-acylate.

The foregoing reactions may be exemplified by the following equation:

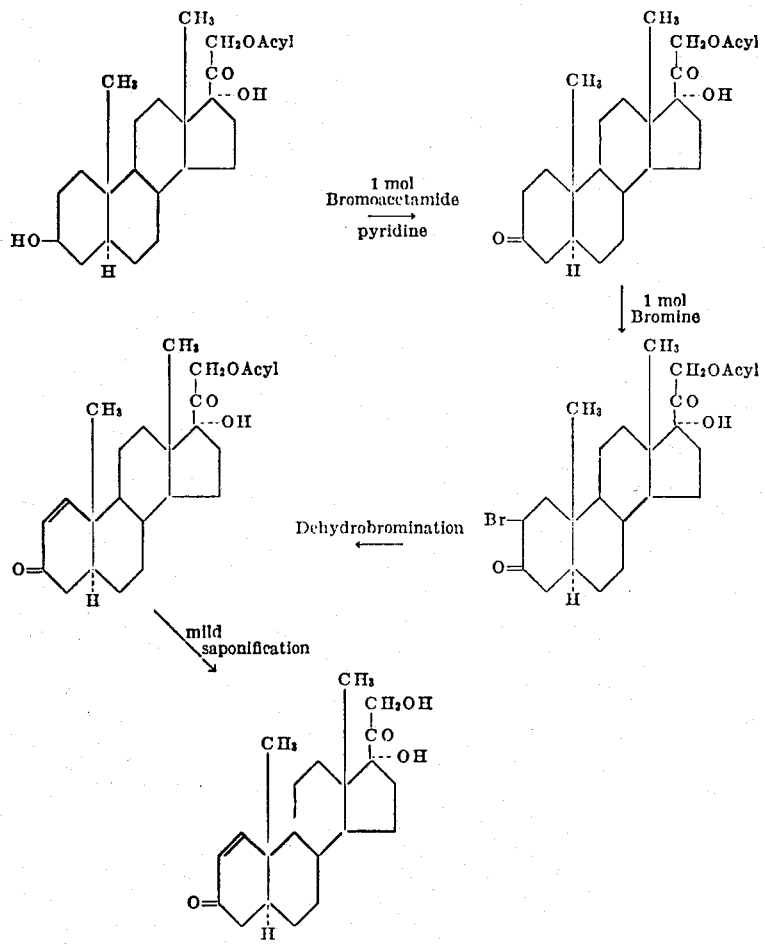

In the foregoing formula the acyl group indicated is the residue of a lower fatty acid. There may therefore be produced, in accordance with the foregoing, allopregnane-17a,21-diol-3,20-dione 21-acylates which may be indicated by the following formula:

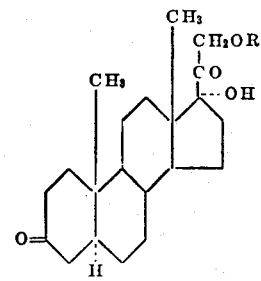

wherein R is the residue of a lower fatty acid.

There may also be produced 2-halo-allopregnane - 17a,21 - diol - 3,20 - dione 21 - acylates which may be indicated by the following formula:

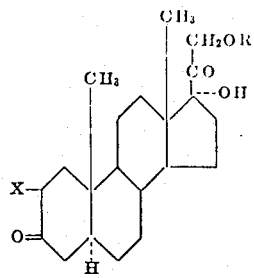

wherein X is selected from the group consisting of bromine or chlorine and R is the residue of a lower fatty acid.

There may also be produced $\Delta^{1,2}$-allopregnene-17a,21-diol-3,20-dione 21-acylates which may be indicated by the following formula:

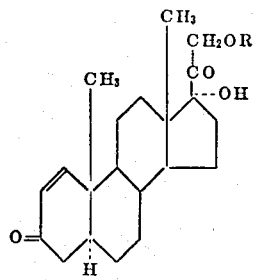

wherein R is the residue of a lower fatty acid.

The following specific examples serve to illustrate the present invention but are not intended to limit the same:

Example I

A solution of 5 grams of allopregnane-3β,17α,21-triol-20-one 21-monoacetate in 1 liter of tertiary butyl alcohol and 10 cc. of pyridine was allowed to stand with 3.6 grams of N-bromoacetamide for 16 hours. The reaction product: allopregnane-17α,21-diol-3,20-dione 21-monoacetate crystallized from the solution and was filtered off. After recrystallization from ethyl alcohol it had a melting point of 245-247° C.

Example II

To a solution of 10 grams of allopregnane-17α,21-diol-3,20-dione 21-monoacetate in 3 liters of glacial acetic acid, 3 drops of hydrobromic acid and 4.1 grams of bromine dissolved in 48 cc. of glacial acetic acid were added. After standing for 10 minutes the solution was poured into water and the precipitate filtered off and washed with water. The dried product was recrystallized from methyl alcohol. The 2-bromo-allopregnane-17α,21-diol-3,20-dione 21-monoacetate melted at 200-201° C. with a decomposition.

Example III 6 grams of 2-bromo-allopregnane-17α,21-diol-3.20-dione 21-monoacetate were refluxed in 24 cc. of collidine for 65 minutes. The solution was cooled to room temperature and poured into diluted sulfuric acid. The precipitated product was filtered off, washed thoroughly with water and dried. After several recrystallizations from ethyl acetate the $\Delta^{1,2}$-allopregnene-17α,21-diol-3,20-dione 21-monoacetate melted at 260-263° C.

Example IV 190 mg. of $\Delta^{1,2}$-allopregnene-17α,21-diol-3,20-dione 21-monoacetate were refluxed with 300 mg. of potassium bicarbonate in 55 ml. of 90 per cent methanol for one and a half hours. After adding 10 ml. of water the solution was concentrated in vacuo and extracted with ethyl acetate. The ethyl acetate solution was dried with anhydrous sodium sulfate, filtered and evaporated to a small volume. The crystals of the $\Delta^{1,2}$-allopregnene-17α. 21-diol-3,20-dione, after several recrystallizations from ethyl acetate, melted at 235-239° C.

It will be obvious to those skilled in the art that various changes may be made without departing from the spirit of the invention and therefore the invention is not limited to what is described in the specification but only as indicated in the appended claims.

We claim:

1. A $\Delta^{1,2}$ - allopregnene - 17α,21 - diol - 3,20-dione 21-acylate having the following formula:

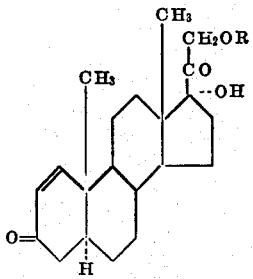

wherein R is a lower fatty acid radical.

2. A $\Delta^{1,2}$ - allopregnene - 17α,21 - diol - 3,20-dione 21-acetate having a melting point of 260-263° C.

3. A $\Delta^{1,2}$ - allopregnene - 17α,21 - diol - 3,20-dione having a melting point of 235-239° C.

4. A process for the production of $\Delta^{1,2}$-allopregnene-17α,21-diol-3,20-dione 21-acylate comprising treating allopregnane-3β,17α,21-triol-20-one 21-acylate with a compound selected from the group consisting of compounds having the formula:

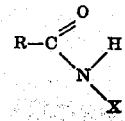

and

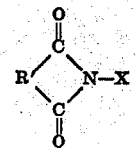

wherein R' is selected from the group consisting of aromatic and aliphatic radicals, R is an aliphatic radical and X is selected from the group consisting of bromine and chlorine in the presence of a weak organic base to produce allopregnane-17α,21-diol-3,20-dione 21-acylate, brominating allopregnane-17α,21-diol-3,20-dione 21-acylate to produce 2-bromo-allopregnane-17α,21-diol-3,20-dione 21-acylate and subjecting 2-bromo-allopregnane-17α,21-diol-3,20-dione 21-acylate to dehydrobromination.

5. A process for the production of $\Delta^{1,2}$-allopregnene-17α,21-diol-3,20-dione 21-acylate comprising treating allopregnane-3β,17α,21-triol-20-one 21-acylate with 1 mol of bromoacetamide in the presence of pyridine to produce allopregnane-17α,21-diol-3 20-dione 21-acylate, brominating allopregnane-17α,21-diol-3,20-dione 21-acylate to produce 2-bromo-allopregnane-17α,21-diol-3,20-dione 21-acylate and treating 2-bromo-allopregnane-17α,21-diol-3,20-dione 21-acylate with collidine.

6. A process for the production of $\Delta^{1,2}$-allopregnene-17α,21-diol-3,20-dione comprising treating allopregnane-3β,17α,21-triol-20-one 21-acylate with a compound selected from the group consisting of compounds having the formula:

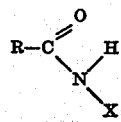

and

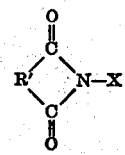

wherein R' is selected from the group consisting of aromatic and aliphatic radicals, R is an aliphatic radical and X is selected from the group consisting of bromine and chlorine, in the presence of a weak organic base, to produce allopregnane-17α,21-diol-3,20-dione 21-acylate, brominating allopregnane-17α,21-diol-3,20-dione 21-acylate to produce 2-bromo-allopregnane-17α,21-diol-3,20-dione 21-acylate, subjecting 2-bromo-allopregnane-17α,21-diol-3,20-dione 21-acylate to dehydrobromination to produce $\Delta^{1,2}$-allopregnene- 17α,21-diol-3,20-dione 21-acylate and subjecting the Δ¹,²-allopregnene-17α,21-diol-3,20-dione 21-acylate to mild hydrolysis.

GEORGE ROSENKRANZ.
STEPHEN KAUFMANN.
JOHN PATAKI.

References Cited in the file of this patent

UNITED STATES PATENTS

| Number | Name | Date |
|---|---|---|
| 2,143,453 | Ruzicka | Jan. 10, 1939 |
| 2,260,328 | Miescher | Oct. 28, 1941 |
| 2,401,775 | Reichstein | June 11, 1946 |
| 2,441,560 | Butenandt | May 18, 1948 |

FOREIGN PATENTS

| Number | Country | Date |
|---|---|---|
| 235,192 | Switzerland | Mar. 16, 1945 |

OTHER REFERENCES

Fieser et al., Natural Products Related to Phenanthrene, 3rd ed., p. 262 (1949).